(12) United States Patent
Cortenraad et al.

(10) Patent No.: US 7,731,387 B2
(45) Date of Patent: Jun. 8, 2010

(54) LIGHTING DEVICE WITH USER INTERFACE FOR LIGHT CONTROL

(75) Inventors: Hubertus Maria Rene Cortenraad, Maastricht (NL); Anthonie Hendrik Bergman, Eindhoven (NL); Elmo Marcus Attila Diederiks, Eindhoven (NL); Martijn Adrianus Bernardus Santbergen, Amsterdam (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 511 days.

(21) Appl. No.: 11/576,282

(22) PCT Filed: Sep. 20, 2005

(86) PCT No.: PCT/IB2005/053096

§ 371 (c)(1),
(2), (4) Date: Mar. 29, 2007

(87) PCT Pub. No.: WO2006/038135

PCT Pub. Date: Apr. 13, 2006

(65) Prior Publication Data

US 2009/0179586 A1     Jul. 16, 2009

(30) Foreign Application Priority Data

Oct. 4, 2004   (EP)   ................................. 04104840

(51) Int. Cl.
*F21V 9/00*   (2006.01)

(52) U.S. Cl. ..................... 362/231; 362/249.12; 700/17

(58) Field of Classification Search ................. 362/231, 362/295, 249.12; 315/292; 700/17, 28; 340/5.64, 340/5.1, 825.29
See application file for complete search history.

(56) References Cited

U.S. PATENT DOCUMENTS

| 5,516,105 | A  | * | 5/1996  | Eisenbrey et al. | ....... 273/148 B |
| 6,299,102 | B2 | * | 10/2001 | Happ | .................... 244/122 AG |
| 6,597,347 | B1 |   | 7/2003  | Yosutake | |
| 6,900,735 | B2 | * | 5/2005  | Guerrieri et al. | ......... 340/815.4 |
| 2004/0130316 | A1 | * | 7/2004 | Grueger et al. | ........... 324/207.2 |

FOREIGN PATENT DOCUMENTS

| DE | 19942177 A1 | 3/2001 |
| WO | 2004072840 A1 | 8/2004 |

OTHER PUBLICATIONS

George W. Fitzmaurice et al; "Bricks: Laying the Foundations for Graspable User Interfaces", CI '95, Conf. Proc. , Denver, May 7, 1995, Conf. on Human Factors in Computing Systems, NY, pp. 442-449, XP000538473.

* cited by examiner

*Primary Examiner*—Sandra L O'Shea
*Assistant Examiner*—Evan Dzierzynski
(74) *Attorney, Agent, or Firm*—Mark L. Beloborodov

(57) ABSTRACT

The present invention relates to a lighting device (1) comprising a lighting unit (2) and a user interface (3) for controlling the lighting color and/or intensity of the lighting unit (2). The user interface (3) comprises a physical object (4), which is shaped as a polyhedron, for instance a cube. Orienting the physical object (4), i.e. choosing which side is up, serves to select the color, and rotating the physical object (4) about the side on which it rests serves to change the intensity setting. The user interface (3) generates an output signal, which is the input for a processing unit (9). This processing unit (9) converts this signal into a driving signal suitable for controlling the lighting unit (2).

18 Claims, 2 Drawing Sheets

LIGHTING DEVICE WITH USER INTERFACE FOR LIGHT CONTROL

Figure 1:
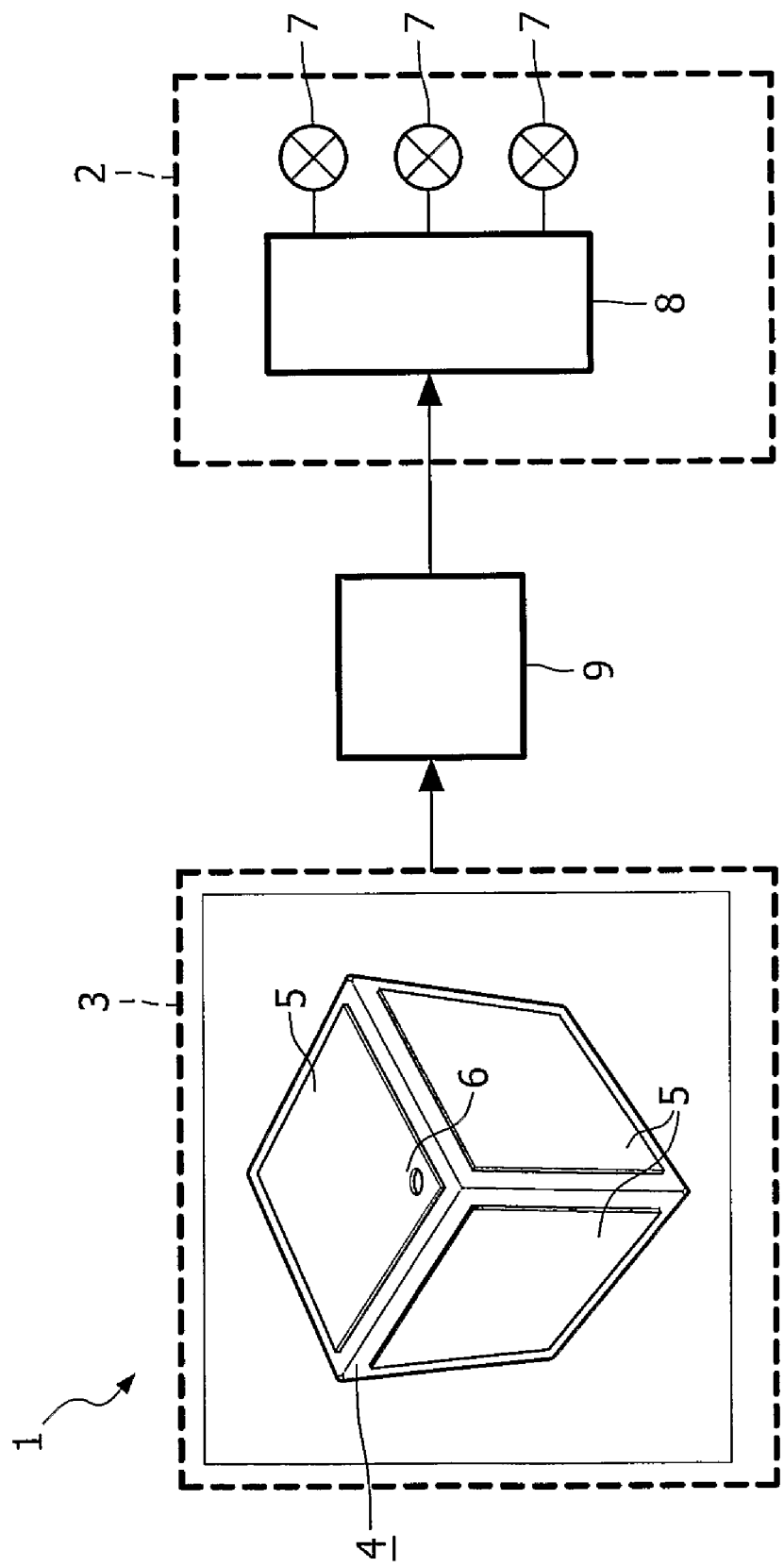

The invention relates to a lighting device comprising a lighting unit and an interface for controlling the lighting color and/or intensity of the lighting unit.

The invention further relates to a user interface for controlling a lighting device, to an assembly of a lighting unit and a processing unit controlled by such a user interface, and to a method for controlling a lighting device.

Present-day light sources mainly contain only one lighting color, and these light sources can be controlled by switching them on or off or by dimming. In the near future light sources which are capable of producing a whole spectrum of colored light will become commonplace, also in every household. These kinds of light sources will enable the creation of almost any color and atmosphere, depending on the room or place to be lit.

As a consequence, the control of such light sources will become more complex, because besides the luminous intensity or brightness the color aspects have to be controlled as well. Since the change of lighting color will be new to many people, it is of importance that such a control unit should be easy to use.

It is a disadvantage of the prior art technology that it does not provide an easy method of controlling light sources with a wide spectrum.

It is an object of the present invention to provide a lighting device which can be controlled in an easy and intuitive manner.

According to the present invention, this object is realized by a lighting device comprising a lighting unit and a user interface for controlling the lighting color of the lighting unit, said user interface comprising a physical object shaped as a polyhedron having a plurality of sides which are arranged to control a particular lighting color, the lighting color is determined by the orientation of the physical object in operation, whereupon the user interface generates an output signal for controlling the lighting unit in accordance with said lighting color.

The invention is based on the recognition that it is intuitively very easy for a person when he/she can control the lighting conditions in a room by simply orienting a physical object in such a way that the person can directly see from this object which lighting color he/she has selected, whereupon the lighting unit will be adjusted accordingly. This can be achieved by indicating the selected color on the side of the physical object which is arranged to control said color.

Besides the control of the lighting color, it is preferred that the user interface furthermore comprises means for controlling the luminous intensity.

In a preferred embodiment, the intensity is controlled by rotating the physical object about an axis which is oriented perpendicularly to the side on which the physical object rests. This embodiment provides a very simple way of controlling the light in a room. First, the user chooses the color. He does this by orienting the physical object, which is shaped as a polyhedron, on one of its sides. Then he adjusts the luminous intensity—this is the dimming function of the lighting device—by rotating the physical object about an axis perpendicular to the side facing down.

Note that in this application the wordings 'orienting' or 'orientation' are used for positioning the physical object on one of its sides, whereas, 'rotate' or 'rotation' are used for the rotation of the physical object about an axis perpendicular to said side without changing the side on which the physical object rests.

In further embodiments, the physical object is provided with an orientation sensor for determining the orientation of said physical object. The orientation sensor may comprise three orthogonally placed acceleration sensors. This is necessary for determining on which side the physical object rests. A well-known orientation sensor is the acceleration sensor, one for each of the three orthogonal directions, which measures the gravitational force in these three directions.

In a still further embodiment, the orientation sensor comprises two sets of three orthogonally placed acceleration sensors each. The use of two sets of acceleration sensors makes the user interface very well suitable for measuring the rotation as well. If only one set of acceleration sensors is used, it is possible for the axis of rotation of the physical object to pass through the set of acceleration sensors, with the result that the rotation is not noticed.

In alternative embodiments, the orientation sensor comprises a gravity switch, and the physical object further comprises a magnetic field sensor for determining the rotation of said physical object. This constitutes an alternative to the acceleration sensors. If a gravity switch is used for establishing the orientation, it is necessary to provide an additional sensor for measuring the rotation. It is suitable to use a magnetic field sensor for this purpose. This type of sensor is used in an electronic compass and is available in the form of an integrated circuit.

The physical object is chosen from the subclass of polyhedrons with the feature that each selected side of such a polyhedron has an opposite side which is parallel to said selected side. The choice of this type of polyhedron implies that there is always a top side corresponding to the down side on which the polyhedron rests. When the selected color is indicated on this top side, it is easy for the user to see what his choice is. Furthermore, the polyhedron may be a regularly shaped polyhedron, a cube being the most familiar.

A further advantage may be found in providing the physical object with sides that are replaceable. A construction like this makes it possible to change the selectable colors on the physical object, by just putting other—colored—sides in the polyhedron.

In further embodiments, each side is provided with a light source which in operation will emit light associated with the particular lighting color which said side is arranged to control, or each side is provided with a light source, and the side which is selected for driving the lighting unit will, in operation, emit light of the same color as the color emitted by the lighting unit. This has the advantage that the user can easily see the color of the light he will adjust if all the sides are lit, or of the color he has chosen if only the side corresponding to the selected color—e.g. the top side—emits light.

Furthermore, it is preferred that the sides comprise means for communicating to a processing unit the respective colors they are arranged to control. This is particularly advantageous in embodiments with replaceable sides. in that case the user interface sends the information on the colors used in the different sides automatically to a processing unit. The user does not have to take any additional action. For instance, these replaceable sides may incorporate RFID tags, which may contain a code for the color corresponding to said side. This code will be used in the user interface.

It is convenient for the user if the user interface acts as a remote control. This can be achieved by providing the user interface with a transmitter for communicating with the processing unit.

In a preferred embodiment of the lighting unit, this lighting unit comprises light sources for generating the primary lighting colors such as red, green, blue and/or amber.

In the 1931 CIE chromaticity diagram, these primary colors will form a triangle or quadrangle, depending on whether three or four primary colors are used. All colors within this triangle or quadrangle can be generated by adjusting the ratio of the intensities of these three or four primary light sources. The use of four primary colors leads to a lighting device with a very wide color gamut and thus a very accurate color reproduction. Especially when light-emitting diodes (LEDs) are used as lighting sources, the color reproduction is improved by the addition of a fourth primary color, because the emission spectra of LEDs are rather narrow-banded.

Furthermore, such a lighting unit enables the choice of a wide range of color temperatures of white light, from cold light—like the light of lamps of the halogen type—to warm light—like the light of conventional light bulbs.

The use of LEDs is an example for a lighting device according to the present invention, but should not be considered as limiting. The invention is also applicable to incandescent lamps, fluorescent lamps, and other light sources.

A further application of the present invention is a lighting device comprising a lighting unit and a user interface for controlling the lighting setting of the lighting unit, said user interface comprising a physical object shaped as a polyhedron having a plurality of sides which are each arranged to control a particular lighting setting, the lighting setting being determined in operation by the orientation of the physical object, whereupon the user interface generates an output signal for controlling the lighting unit in accordance with said lighting setting.

This means that the present invention is not limited to the control of the lighting color of a lighting device, but that also other quantities of a lighting device can be controlled in a fully equivalent manner. Examples that may come to mind are: controlling the luminous intensity by associating a side of the polyhedron with a selected intensity, controlling the level of saturation of a selected color, and controlling different light sources where each side of the polyhedron represents a particular light source.

Furthermore, it will be possible to associate a certain side of the polyhedron with an overall lighting setting in a room. By properly programming the processing unit, the user will be able to choose which lamps are on, what color setting each lamp will have, what the intensities of the individual lamps will be, and when it is time to switch off. A certain side of the polyhedron may be associated with a certain activity, for example watching TV or reading a book, which requires a particular lighting setting in a room.

The invention further relates to a user interface for controlling a lighting unit of such a lighting device, an assembly of a lighting unit and a processing unit controlled by such a user interface, as well as to a method of controlling this lighting unit.

These and other aspects of the invention are apparent from and will be elucidated by way of non-limitative examples with reference to the drawings and the embodiments described hereinafter.

Figure 2:
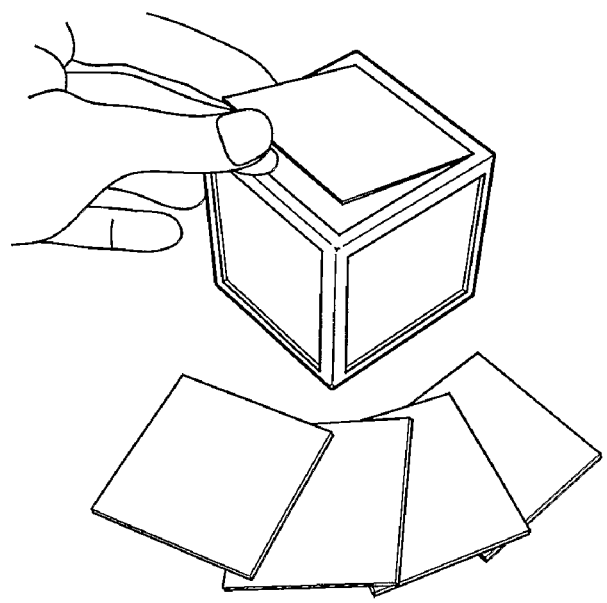
Figure 3:
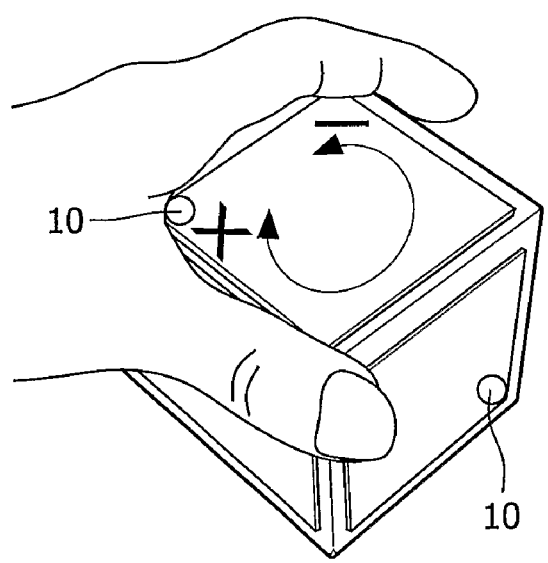

In the drawings:

FIG. 1 is a schematic drawing of the lighting device according to the invention;

FIG. 2 gives an embodiment of the user interface of the lighting device according to the present invention; and FIG. 3 gives a functional aspect of the user interface.

FIG. 1 gives a schematic overview of the different components of the lighting device 1 according to the present invention. The lighting device 1 comprises a lighting unit 2 and a user interface 3. The user interface 3 comprises a physical object 4—in FIG. 1 this is represented by the cube, as an example of a polyhedron—with a plurality of sides 5. By orienting the cube, i.e. choosing on which side the cube rests, the user can select the desired lighting color of the lighting unit 2. The user can adjust the intensity of the lighting unit 2 by rotating the cube about an axis perpendicular to the side on which the cube rests. This results in an output signal of the user interface 3 with the information needed for controlling the color and intensity settings of the lighting unit 2.

The output signal of the user interface 3 is converted into signals suitable for the driver circuit 8 to drive the light sources 7. This conversion from output signal to the choice of color and/or intensity of the lighting unit 2 is done by a processing unit 9, for example a personal computer, which may be a separate entity or alternatively be integrated in the user interface 3 or in the lighting unit 2.

The light sources 7 may be LEDs of different colors, but other light sources such as conventional lamps may also be used.

The present invention will now be described with reference to examples, which should not be considered as limiting the present invention. For the physical object 4—shaped as a polyhedron—a cube will be taken, because this will make the description more transparent. But it is evident that the invention is not limited to cubes, and that many polyhedral objects may be used instead.

If the physical object 4 has the shape of a cube comprising six sides, the user interface can have six preset colors. The user selects one of the colors by orienting the cube on, for example, a table. So, the selected color depends on which color is at the bottom or on top. Preferably, the user should be able to see directly from the user interface 3 which color is selected, even if the lighting device 1 is in the off state. So the user-friendliest choice is when the upper side indicates the selected color. Each side 5 should have an identification corresponding with the color to be selected thereby, and this identification should be transmitted to the user interface 3 when this color is actually selected.

The processing unit 9 requires two types of information for generating the signal which is suitable for the driver circuit 8 and which determines the actual color settings of the lighting unit 2. In the first place, the user interface 3 has to communicate the orientation of the cube. This can be done by means of a three-dimensional acceleration sensor. In fact, such a sensor comprises three independent sensors, which are orthogonally placed in the directions of the three axes of symmetry of the cube, which are perpendicular to the sides 5. This type of sensor is well known and measures the acceleration caused by the earth's gravitational field, thus determining the orientation of the cube.

As an alternative for these acceleration sensors, it is also possible to use a gravity switch. This switch may be constructed as a small cube that is placed inside the cube, which is the physical object 4. This small cube has sides which are each provided with, for example, two electrical contacts. In the interior of the small cube a conducting element is present that electrically closes the open connection between the two electrical contacts on the bottom side of the small cube, because the conducting element drops to the bottom, thus establishing its orientation. Note that such a switch can be used for any kind of polyhedron, just by making a miniature version of said polyhedron and positioning this miniature version with the same orientation at the inside of the polyhedron that forms the physical object 4.

This data relating to the orientation of the cube can be transmitted, preferably wirelessly, from the user interface 3 to the processing unit 9.

The second type of information that is required is that of the available colors on the cube and which color is actually selected. This can be done by providing each side 5 of the cube with a small electrical circuit comprising, for example, a number of resistors. Preferably, this number corresponds to the number of different colored light sources 7 in the lighting unit 2. Then the choice of resistors determines the prevailing ratio between the different light sources 7. The color of the lighting unit 2 thus adjusted corresponds to the color of the side 5. This information may also be programmed into an integrated circuit. The resistor values are used by the user interface 3.

Alternatively, the sides 5 may be provided with an RFID tag, which communicates its 'color' automatically, so that the user interface 3 can transfer this data to the processing unit 9.

Furthermore, it will also be possible to provide the processing unit 9 with a look-up table, which is manually fed with data coupling the color of a side 5 to the orientation of the cube. Then, when the cube is given a certain orientation, the color emitted by the lighting unit 2 will be derived from the data in the look-up table.

The cube may be constructed such that the sides 5 can be easily changed. This has the advantage that the user can choose any set of preset colors he likes. For example, the sides of the cube may consist of colored squares that can be clicked onto the cube, as shown in FIG. 2. Separate sets with alternative preset colors may be available in shops. Each separate side 5 should be provided with means for identifying its color to the lighting device 1, so that the processing unit 9 receives the proper input signal from the user interface 3. If the processing unit 9 operates with a look-up table, the user has to adapt this look-up table in order to represent the colors of the newly inserted sides 5.

The sides 5 may also be provided with light sources of the associated colors. For example, it will be possible to make a cube of which the sides each consist of a diffuser with primary color LEDs behind it. The different colors of the sides can then be controlled electronically as well. Furthermore, the side which corresponds to the actual selected color setting may have a significantly higher light output in order to make the user interface 3 more intuitively operable.

An additional function of the user interface 3 may be the adjustment of the intensity of the light. This function is shown in FIG. 3. The intensity of the light emitted by the lighting unit 2 can be controlled by rotating the cube about an axis while it rests on, for example, a table. This rotation does not change the orientation, i.e. the top side remains the top side. This function can be obtained by arranging the user interface 3 such that a clockwise rotation will increase the intensity and an anti-clockwise rotation will decrease the intensity, similar to a normal dimming device. A very quick shock-wise small orientation can be used to switch the lighting unit 2 on or off. As an alternative, switching on and off the lighting device 1 may also be done with a switch 6 on the outer surface of the user interface 3, as indicated in FIG. 2. Furthermore, it is possible to color one of the sides 5 black and to associate this side with the off-state of the lighting device 1.

The rotation of the cube can be detected by the same acceleration sensor that is used for determining its orientation. However, it may occur that the cube is rotated only about an axis of rotation that coincides with the axis of the acceleration sensor, in which case the rotation will not be registered. This problem can be solved by the use of two acceleration sensors, which may be positioned in two diagonally spaced corners of the cube as indicated by the white dots 10 in FIG. 3. If a gravity switch is used for determining the orientation of the cube, it is necessary to add another type of sensor for detecting the rotation of the cube. A well-known sensor for detecting such a rotation is a magnetic field sensor, which is also used in electronic compasses and which is available in the form of an integrated circuit.

Furthermore, the lighting device 1 may be provided with a memory element in which the settings of the lighting device 1 are saved after switching-off. This has the advantage that the light will switch on as it was left the last time it was switched off.

Besides for controlling the color settings, by the orientation of the cube, and the intensity, by rotating the cube of the lighting device 1, the user interface 3 may also be arranged for controlling other parameters. For example, the cube may be used for controlling the saturation or intensity of the lighting unit 2. In that case each side 5 corresponds to a predetermined saturation or intensity level. It is also possible to associate each side 5 with a certain lighting effect.

The user interface 3 may also be programmed so as to control the complete light settings in a room, for example all the color and intensity settings. The sides of the cube may correspond to a setting optimized for working or reading, a setting for watching television, a setting for romantic moments, and so on.

The light settings of a lighting device 1 may also be controlled by a user interface 3 that comprises more than one physical object 4. For example, the user interface 3 may comprise one cube for controlling the color and another cube for controlling the intensity of the lighting unit 2.

Furthermore, the lighting unit 2 may comprise more sub-units; not all the light sources 7 have to be within one housing.

The user processing unit 9 may be a separate unit as indicated by FIG. 1, but alternatively the processing unit 9 may be integrated with the user interface 3 or with the driver circuit 8. The same holds for the driver circuit 8, which may be part of the lighting unit 2, but which may also be a separate unit.

Summarizing, the present invention relates to a lighting device 1 comprising a lighting unit 2 and a user interface 3 for controlling the lighting color and/or intensity of the lighting unit 2. The user interface 3 comprises a physical object 4, which is shaped as a polyhedron, for instance a cube. By orienting the physical object 4, i.e. choosing which side is up, the color can be selected, and by rotating the physical object 4 about the side on which it rests the intensity settings can be changed. The user interface 3 generates an output signal, which is the input for a processing unit 9. This processing unit 9 converts this signal into a driving signal suitable for controlling the lighting unit 2.

The invention claimed is:

1. A lighting device comprising a lighting unit and a user interface for controlling the color and/or luminous intensity of light emitted by the lighting unit, said user interface comprising:
    a physical object shaped as a polyhedron having a plurality of sides, each side being associated with a predetermined color of light such that, in operation, the user interface generates an output signal for controlling the lighting unit to emit the light of a desired color and/or luminous intensity based, at least in part, on orientation and/or rotation of the physical object with at least three degrees of freedom.

2. A lighting device as claimed in claim 1, wherein the user interface further comprises means for controlling the luminous intensity.

3. A lighting device as claimed in claim 2, wherein the intensity is controlled by rotating the physical object about an axis which is oriented perpendicularly to the side on which the physical object rests.

4. A lighting device as claimed in claim 1, wherein the physical object is provided with an orientation sensor for determining the orientation of said physical object.

5. A lighting device as claimed in claim 4, wherein the orientation sensor comprises three orthogonally arranged acceleration sensors.

6. A lighting device as claimed in claim 4, wherein the orientation sensor comprises two sets of three orthogonally arranged acceleration sensors each.

7. A lighting device as claimed in claim 4, wherein the orientation sensor comprises a gravity switch.

8. A lighting device as claimed in claim 4, wherein the physical object further comprises a magnetic field sensor determining the rotation of said physical object.

9. A lighting device as claimed in claim 1, wherein each side of the polyhedron has an opposite side parallel thereto.

10. A lighting device as claimed in claim 9, wherein the polyhedron is a cube.

11. A lighting device as claimed in claim 1, wherein the sides are removable and replaceable.

12. A lighting device as claimed in claim 1, wherein each side comprises a light source for emitting light of the predetermined color associated with said side.

13. A lighting device as claimed in claim 1, further comprising a processing unit in communication with the sides.

14. A lighting device as claimed in claim 13, wherein two or more sides comprise RFID tags.

15. A lighting device as claimed in claim 1, wherein the user interface is configured to remotely control the lighting unit.

16. A lighting device as claimed in claim 1, wherein the lighting unit comprises light sources for generating light of primary colors.

17. A lighting device as claimed in claim 1, wherein the lighting unit comprises LEDs.

18. A method for controlling color and/or luminous intensity of light emitted by a lighting device comprising a lighting unit and a user interface, the user interface comprising a physical object shaped as a polyhedron having a plurality of sides, each side being associated with a predetermined color of light, the method comprising:
 orienting the physical object with at least three degrees of freedom to select a desired color and/or intensity of light,
 rotating the physical object to generate an output signal for controlling the lighting unit, and
 transmitting the output signal to the processing unit to control the lighting unit to emit the light of desired color and/or intensity.

\* \* \* \* \*